(12) United States Patent
Leijon et al.

(10) Patent No.: US 12,432,129 B1
(45) Date of Patent: Sep. 30, 2025

(54) PARTITIONING FOR ACTIVE MONITORING

(71) Applicant: Cisco Technology, Inc., San Jose, CA (US)

(72) Inventors: Viktor M. E. Leijon, San Jose, CA (US); Scott Z. Huang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/617,458

(22) Filed: Mar. 26, 2024

(51) Int. Cl.
| | |
|---|---|
| *H04L 29/06* | (2006.01) |
| *H04L 12/26* | (2006.01) |
| *H04L 41/5009* | (2022.01) |
| *H04L 43/08* | (2022.01) |
| *H04L 43/12* | (2022.01) |
| *H04L 43/50* | (2022.01) |

(52) U.S. Cl.
CPC .......... *H04L 43/08* (2013.01); *H04L 41/5009* (2013.01); *H04L 43/12* (2013.01)

(58) Field of Classification Search
CPC ..... H04L 43/08; H04L 41/5009; H04L 43/12; H04L 29/06; H04L 12/26; H04L 63/1433; H04L 43/50; H04L 63/30
USPC ....................................................... 709/224
See application file for complete search history.

(56) References Cited

U.S. PATENT DOCUMENTS

| | | | |
|---|---|---|---|
| 8,868,396 B1 * | 10/2014 | Shirazi | G06F 30/33 703/13 |
| 2015/0333993 A1 | 11/2015 | Welin et al. | |
| 2019/0245883 A1 * | 8/2019 | Gorodissky | H04L 63/1433 |
| 2020/0084152 A1 | 3/2020 | Zhang et al. | |
| 2020/0127899 A1 * | 4/2020 | Voit | H04L 41/5054 |
| 2020/0204460 A1 | 6/2020 | Schneider et al. | |
| 2020/0204469 A1 | 6/2020 | Filsfils et al. | |
| 2020/0280577 A1 * | 9/2020 | Segal | H04L 63/20 |
| 2021/0144169 A1 * | 5/2021 | Lasser | H04L 43/50 |
| 2022/0278922 A1 | 9/2022 | Kolar et al. | |

OTHER PUBLICATIONS

Claise B., et al., "Service Assurance for Intent-Based Networking Architecture", Internet Engineering Task Force, Request for Comments 9417, Jul. 2023, Retrieved from https://datatracker.ietf.org/doc/html/rfc9417 on Jun. 17, 2024, pp. 1-22.

(Continued)

*Primary Examiner* — Jude Jean Gilles
(74) *Attorney, Agent, or Firm* — Patterson + Sheridan, LLP

(57) ABSTRACT

Embodiments herein selectively transmit probes between network nodes to estimate metrics associated with end-to-end paths through the network. In one embodiment, the network provider identifies key nodes based on a performance heuristic, such as the number of paths that run through each nodes, the amount of traffic that flows through the nodes, and the like. In addition to transmitting probes between the key nodes, supplemental probes can be transmitted from each customer edge device (e.g., a customer endpoint) to the key nodes in the provider's network. The data generated by probing between the key nodes and by probing between the customer edge devices and the key nodes can be combined to estimate metrics associated with end-to-end routes through the network.

20 Claims, 7 Drawing Sheets

(56) References Cited

OTHER PUBLICATIONS

Gandhi R., et al., "Performance Measurement Using Simple Two-Way Active Measurement Protocol (STAMP) for Segment Routing Networks", draft-ietf-spring-stamp-srpm-15, Apr. 24, 2024, Retrieved from https://datatracker.ietf.org/doc/html/draft-ietf-spring-stamp-srpm on Jun. 17, 2024, pp. 1-39.

Luttringer J-R., et al., "Computing Delay-Constrained Least-Cost Paths for Segment Routing is Easier Than You Think", IEEE International Symposium on Network Computing and Applications, Nov. 6, 2020, Retrieved from https://hal.science/hal-02993545, 9 Pages.

* cited by examiner

PARTITIONING FOR ACTIVE MONITORING

TECHNICAL FIELD

Embodiments presented in this disclosure generally relate to selective probing in a network.

BACKGROUND

Service assurance for intent-based networking is essential for service providers to meet Service-Level Agreements. As modern networks become more complex, active monitoring is increasingly important to gain empirical experience and insight into network infrastructure and how network states impact business objectives. Active monitoring injects probing traffic into the network, but an effective probing topology is critical in active monitoring.

As the overlay complexity increases (e.g., multiple virtual networks supported by an underlying physical network), the cost of exhaustive probing grows. That is, as the number of endpoints in an overlay grows, the number of probe sessions needed for full-mesh probing grows as the square of the number of nodes. This means that for large customers with correspondingly large and complex networks, monitoring the entire network quickly becomes cost-prohibitive, and more intelligent methods are needed to prioritize probing.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
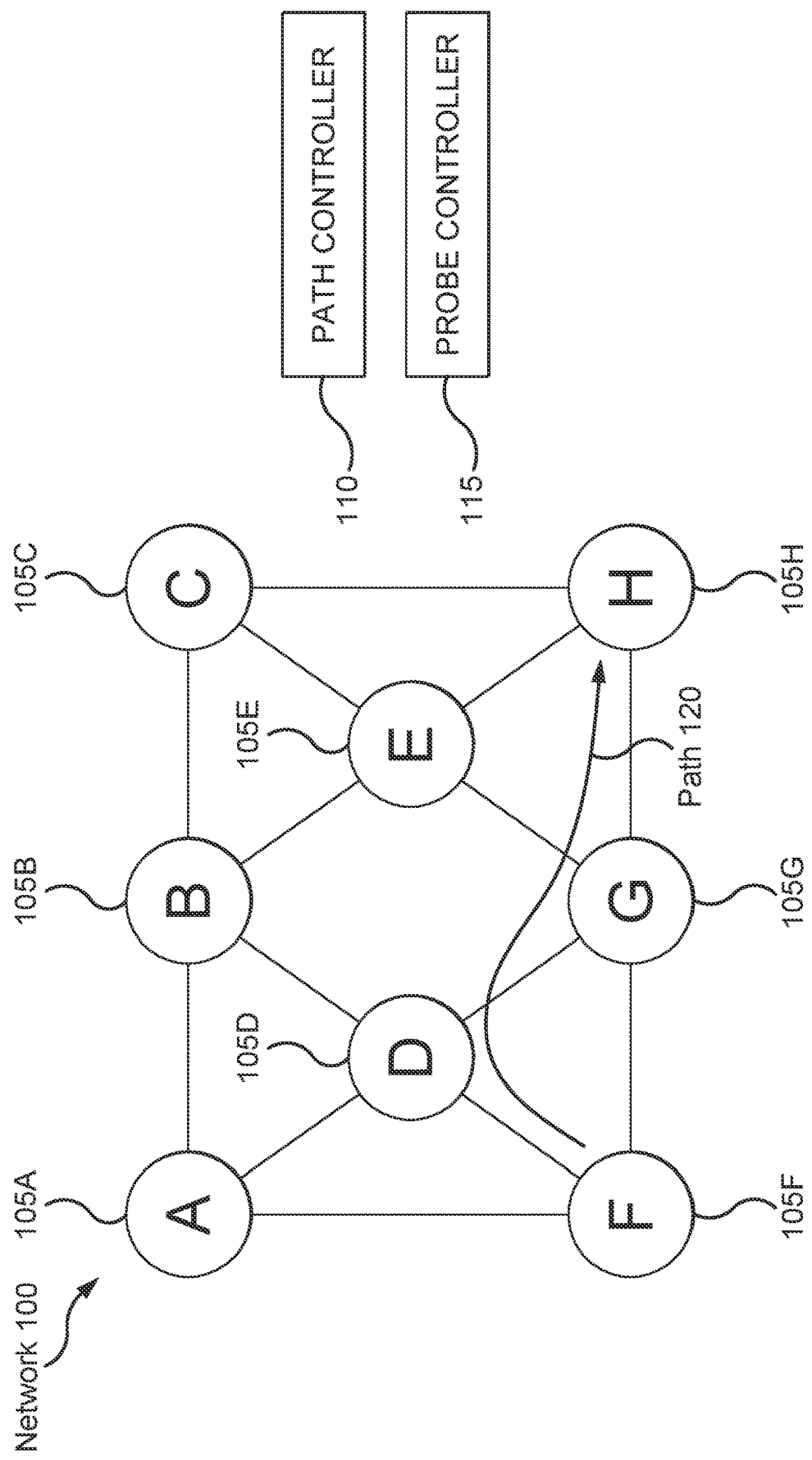
FIG. 1 illustrates a system for measuring heuristics related to a path in a network, according to embodiments described herein.

One embodiment presented in this disclosure is a computing system that includes one or more memories and one or more processors communicatively coupled to the one or more memories where a combination of the one or more processors is configured to: identify a subset of nodes in a network based on evaluating one or more network heuristics; transmit, after identifying the subset of nodes, a first set of probes between the subset of nodes that are connected to each other; transmit a second set of probes between customer endpoints in the network and the subset of nodes the customer endpoints are connected to; and estimate one or more performance metrics for paths through the network based on measurements obtained from the first and second sets of probes.

One embodiment presented in this disclosure is a method that includes identifying a subset of nodes in a network based on evaluating one or more network heuristics; transmitting, after identifying the subset of nodes, a first set of probes between the subset of nodes that are connected to each other; transmitting a second set of probes between customer endpoints in the network and the subset of nodes the customer endpoints are connected to; and estimating whether paths through the network satisfy service level agreements based on measurements obtained from the first and second sets of probes.

One embodiment presented in this disclosure is a non-transitory computer readable medium comprising computer-executable instructions, which when collectively executed by one or more processors of a computing system cause the computing system to perform an operation. The operation includes identifying a subset of nodes in a network based on evaluating one or more network heuristics; transmitting, after identifying the subset of nodes, a first set of probes between the subset of nodes that are connected to each other; transmitting a second set of probes between customer endpoints in the network and the subset of nodes the customer endpoints are connected to; and estimating whether paths through the network satisfy service level agreements based on measurements obtained from the first and second sets of probes.

Example Embodiments

Embodiments herein reduce the number of probes transmitted relative to a system that takes a full-mesh approach (where every node (e.g., switch or router) transmits a probe to every other node). In one embodiment, the network provider identifies key nodes based on a performance heuristic, such as the number of paths that run through each node, the amount of traffic that flows through the nodes, and the like. In one embodiment, the key nodes are provider devices, in contrast to client devices that are coupled to the provider's network.

In one embodiment, full-mesh probes are transmitted between the key nodes (but not to the non-key nodes) in the provider's network. The probes can measure any number of metrics such as latency, variation in latency (e.g., jitter), packet loss, and the like. Performing full-mesh probing only between key nodes can greatly reduce the amount of probing that occurs.

In addition to transmitting probes between the key nodes, supplemental probes can be transmitted from each customer edge device (e.g., a customer endpoint) to the key nodes in the provider's network, but not to the non-key nodes in the provider's network. Probing the connection between the customer edge devices and the provider's edge devices that are designated as key nodes can provide additional information for estimating end-to-end routes through the provider network (e.g., routes from one customer edge device to another customer edge device).

This probing prioritization strategy can greatly reduce the probing traffic and still provide sufficient information to estimate whether key metrics, such as service level agreements (SLAs), are being met by the network provider. For example, the data generated by probing between the key nodes and by probing between the customer edge devices and the key nodes can be combined to estimate metrics associated with end-to-end routes through the network. For example, the latency or jitter for each of the probe segments along an end-to-end route can be added or combined to estimate an overall latency or jitter for the entire route. This estimate can be compared to the SLA to determine whether the route is close to violating the SLA. If so, then a full end-to-end probe can be launched in the network to determine a more accurate measurement. Put differently, the probing prioritization strategy can be used to gather data that can be used to estimate metrics associated with end-to-end routes in the network. These estimates can then be used as an indicator of whether more accurate end-to-end probing should be performed. This can improve network performance and conserve power and compute resources by identifying end-to-end routes that may violate respective SLAs without having to perform end-to-end probing on every route in the provider's network.

FIG. 1 illustrates a system for measuring heuristics related to a path in a network, according to embodiments described herein. FIG. 1 illustrates a network 100 with interconnected network nodes 105A-H. The network nodes 105 can be provider devices (e.g., switches, routers, etc. controlled by a network provider) and customer devices such as customer edge (CE) devices (e.g., switches, routers, etc. controlled by a customer of the network provider).

FIG. 1 illustrates a path 120 from one edge of the network 100 to a different edge of the network 100. For example, the path 120 may be between two CE devices (e.g., network nodes 105F and 105H) which flows through two provider edge (PE) devices (e.g., network nodes 105D and 105G). For example, the path 120 may be between two CE devices for the same customer (e.g., where that customer relies on the network provider to interconnect different local customer networks) or between two different customers that communicate using the network provider's network.

While one path 120 or flow is illustrated, the network 100 may have hundreds, thousands (or more) paths or flows. Traditionally, full-mesh probing between all the network nodes 105 (which are arranged in a full-mesh topology) may have been performed to gather metrics for all the flows and paths in the network 100. However, as discussed above, this may be cost-prohibitive in the sense of using too many computer resources, power, time, etc. Instead, a probe controller 115 can perform selective probing where probing is performed between key nodes in the network 100, and between those key nodes and CE devices. The metrics gathered from these probes can then be combined to estimate metrics for end-to-end routes, such as the path 120. This is discussed in more detail in FIG. 2.

However, the estimate for end-to-end routes obtained using this selective probing strategy may not be accurate enough to confidently determine whether the end-to-end route satisfies a performance threshold or metric defined in, e.g., a SLA. Instead, in one embodiment, the estimates for the end-to-end routes are used as indicators to determine whether full, end-to-end probing should be performed. For example, if an estimate indicates the path 120 is, or is close to, validating an associated SLA, the probe controller 115 can perform end-to-end probing (where a probe is launched in one of the edge devices and travels through all the nodes in the path 120) to obtain (potentially) more accurate metrics, and thus, determine with greater confidence whether the path 120 is, or is not, meeting a SLA. This is discussed in more detail in FIG. 6.

FIG. 1 also illustrates a path controller 110 which can set the paths 120 or flows through the network 100. In one embodiment, the path controller 110 establishes individual segments that form the paths or flow (e.g., segment routing (SR)). For example, the path controller 110 may be a Segment Routing Path Computation Element (SR-PCE). A SR-PCE can learn topology information by using interior gateway protocol (IGP) or through border gateway protocol (BGP) link state. SR-PCE uses a traffic engineering (TE) metric in its path calculations to optimize a cumulative TE metric and can use an IGP metric in its path calculations to optimize reachability. Further, SR-PCE can use path computation algorithms to compute a pair of disjoint label switched paths (LSPs). The disjoint paths can originate from the same head-end or different head-ends. Disjoint level refers to the type of resources that should not be shared by the two computed paths. However, a SR-PCE is just one suitable example of a path controller 110 that can discover the topology of the network 100 and create the paths 120 (e.g., an overlay) in the network 100.

Figure 2:
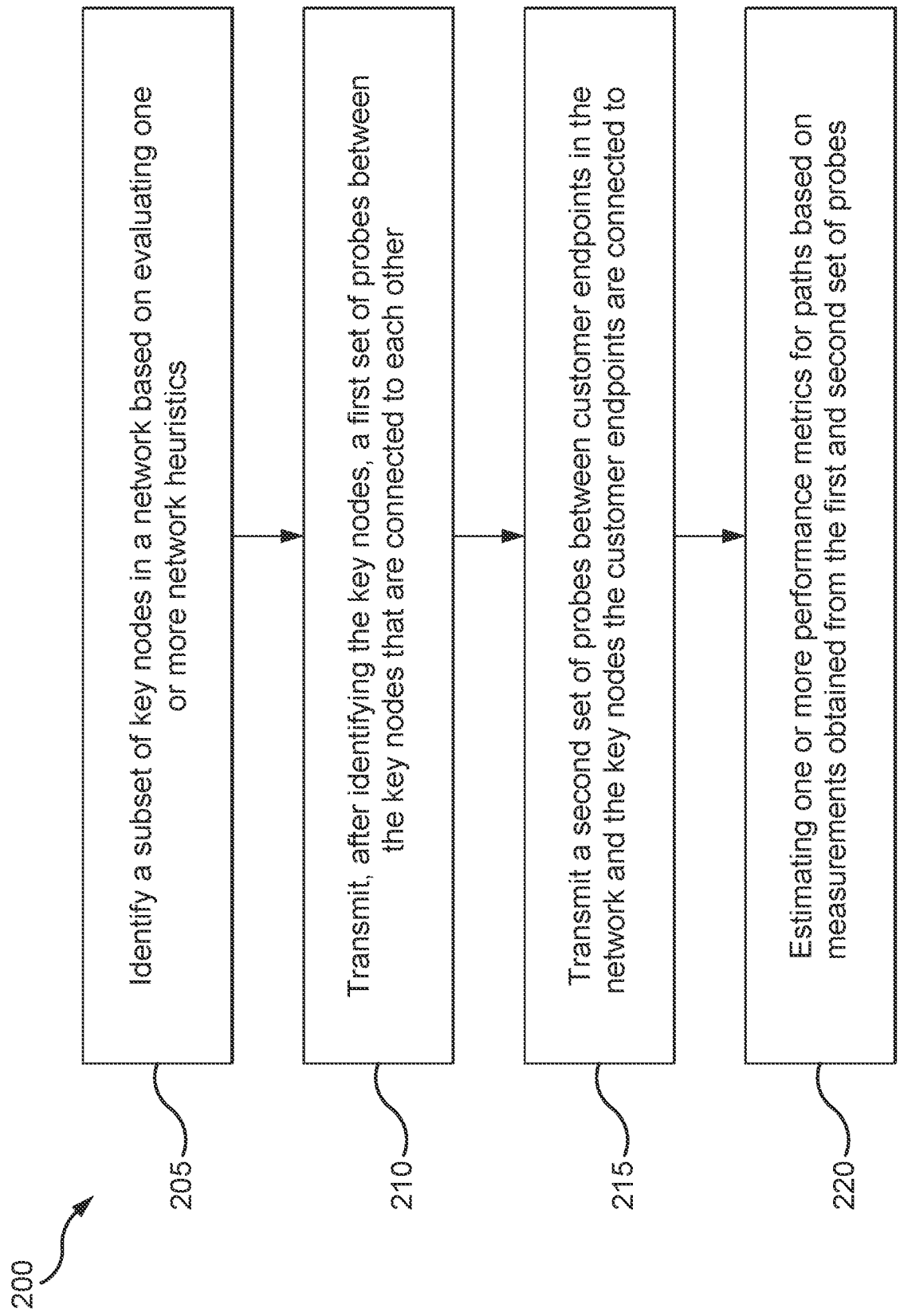
FIG. 2 is a flowchart for selectively probing nodes in a network, according to embodiments described herein.

FIG. 2 is a flowchart of a method 200 for selectively probing nodes in a network, according to embodiments described herein. For ease of explanation, the following blocks in the method 200 are discussed in tandem with FIGS. 3-5.

At block 205, a probe controller (e.g., the probe controller 115 in FIG. 1) identifies a subset of key nodes in a network based on evaluating one or more network heuristics. For example, a system administrator may define a key node as a network node that is in the top 10% of network nodes according to the number of paths or flows that use the network node. Or the system administrator may define a key node as a network node that is in the top 10% of network nodes according to the amount of traffic volume that flows through the node. The system administrator can change this definition depending on how much, or how little, probing should be performed by the network. For example, increasing the percentage means more nodes are selected as key nodes, while decreasing the percentage means fewer nodes are selected as key nodes. As discussed in the rest of the method 200, reducing the number of key nodes reduces the amount of probing being performed, but can also result in less accurate estimates of metrics corresponding to end-to-end routes.

In one embodiment, a path controller (e.g., the path controller 110 in FIG. 1 such as a SR-PCE/PCEP) is aware at the controller level of the paths assigned between endpoints in the underlay network. This allows the path controller to compute how many paths are passing through each node in the network in order to identify the key nodes. In one embodiment, the determination of the key nodes could be weighted by traffic volume instead of number of flows.

Figure 3:
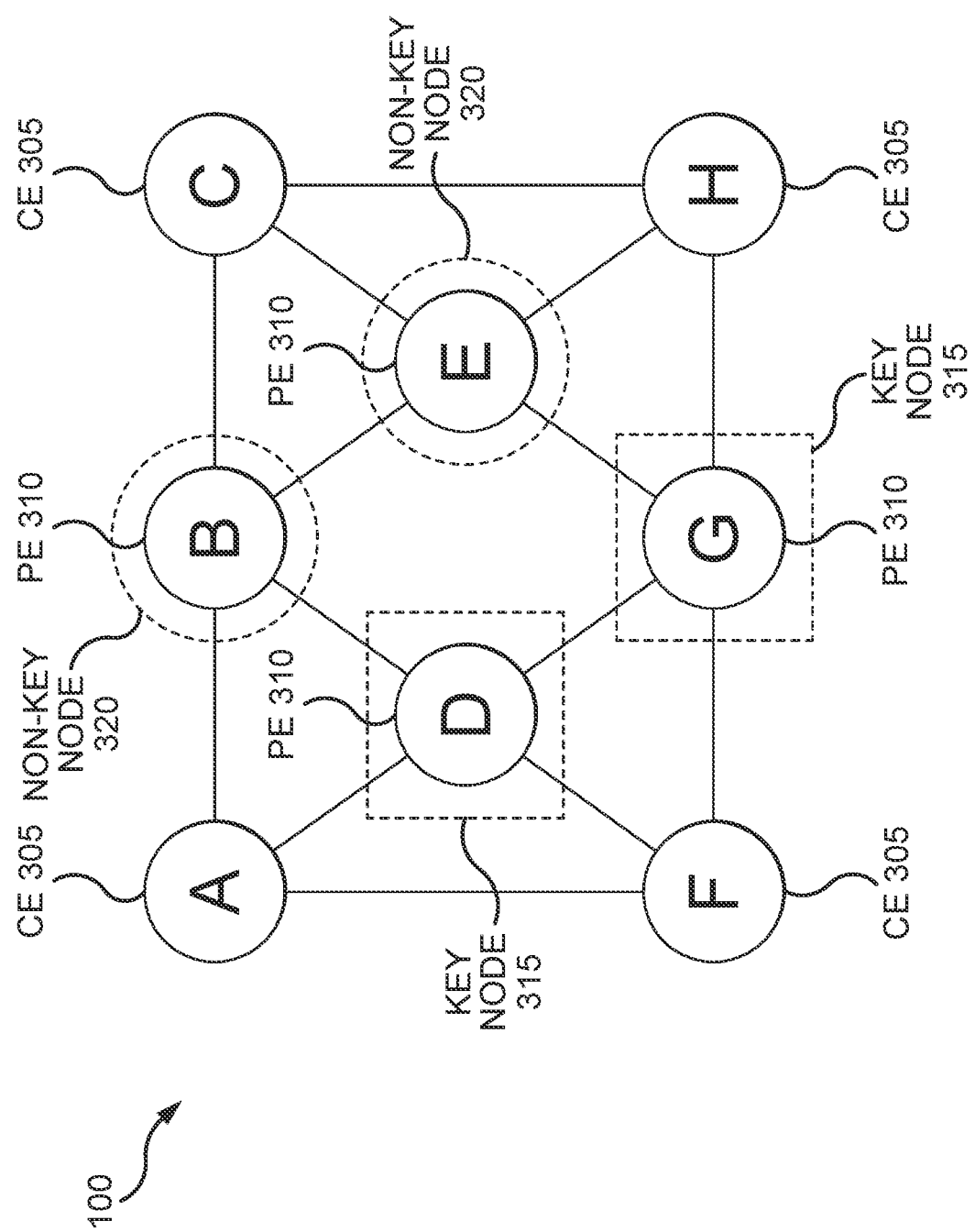
FIG. 3 illustrates identifying key nodes in a network, according to embodiments described herein.

FIG. 3 illustrates identifying key nodes in the network 100 in FIG. 1, according to embodiments described herein. In this example, the nodes in the network 100 are either CEs 305 (i.e., customer edge devices) or PEs 310 (i.e., provider edge devices). In this embodiment, the probe controller (or path/network controller) has used one or more metrics as described in block 205 of method 200 to identify which of the PEs 310 are key nodes. That is, in this example, the probe controller evaluates only the provider's network nodes (and not the customer's network nodes) to identify a subset of key nodes.

In this example, Node D and Node G have been identified as key nodes 315 while the Node B and Node E are non-key nodes 320. For example, Nodes D and G may have more flows, or more traffic, passing through them. As such, the probe or path controller has identified them as key nodes. Of course, FIG. 3 is a simplification of network topology. In a real-world implementation, a network provider may have a core network and ancillary networks or branches. In such an arrangement, the network nodes forming the core network may more likely be identified as key nodes such they may service more flows or more data, rather than the network nodes forming the branches.

Returning to the method 200, at block 210 the probe controller transmits (or causes to be transmitted) a first set of probes between the key nodes that are connected to each other. For example, the network nodes may in a full-mesh topology. In that case, the probes can be transmitted between each of the key nodes that are connected to each other in the full-mesh topology. However, at block 210, the key nodes may not transmit probes to non-key nodes, nor do the non-key nodes transmit probes to each other. That is, the provider's network nodes that are non-key nodes may not participate in the probing performed at block 210.

Figure 4:
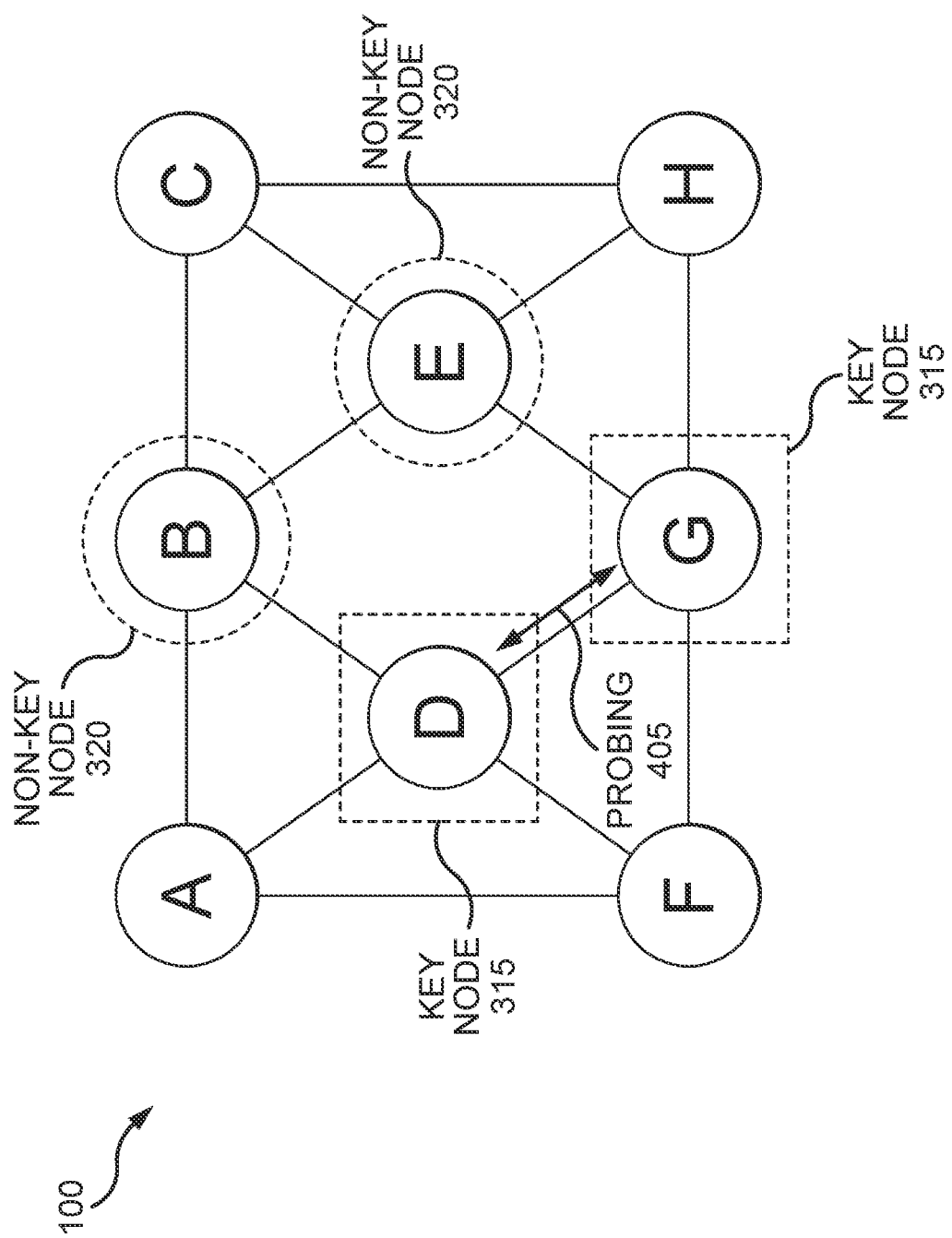
FIG. 4 illustrates probing between key nodes in a network, according to embodiments described herein.

FIG. 4 illustrates probing between key nodes in the network 100, according to embodiments described herein. As shown, FIG. 4 illustrates performing probing 405 where one or more probes are exchanged between the key nodes 315. However, probes are not sent between the key nodes 315 and the non-key nodes 320, or between the non-key nodes 320.

Further, in this example, the customer edge devices (e.g., Nodes A, C, F, and H) are not considered as key nodes, and thus, are not probed. As such, in one embodiment, the probing performed at block 210 of the method 200 may only be between the provider's network nodes that are identified as key nodes.

Moreover, in one embodiment, the probe controller may perform probing 405 between two key nodes only if a shared path or flow includes both of those key nodes. For example, in one embodiment although Node D and Node G are both key nodes with a direct connection, if the path controller determines there is not at least one path or flow that includes both of those nodes, then it would not exchange probes between those key nodes. As discussed below, the probes may be used to estimate end-to-end metrics for the flow or paths. Thus, if no flow or path includes both Node D and Node G, then learning metrics of the connection between those nodes may not be useful for estimating metrics for end-to-end paths in the network 100.

Returning to the method 200, at block 215, the probe controller transmits (or causes to be transmitted) a second set of probes between customer endpoints in the network and the key nodes the customer endpoints are connected to. For example, the probe controller may probe the connections between CEs and key PEs in the provider's network, but not between CEs and non-key PEs.

Figure 5:
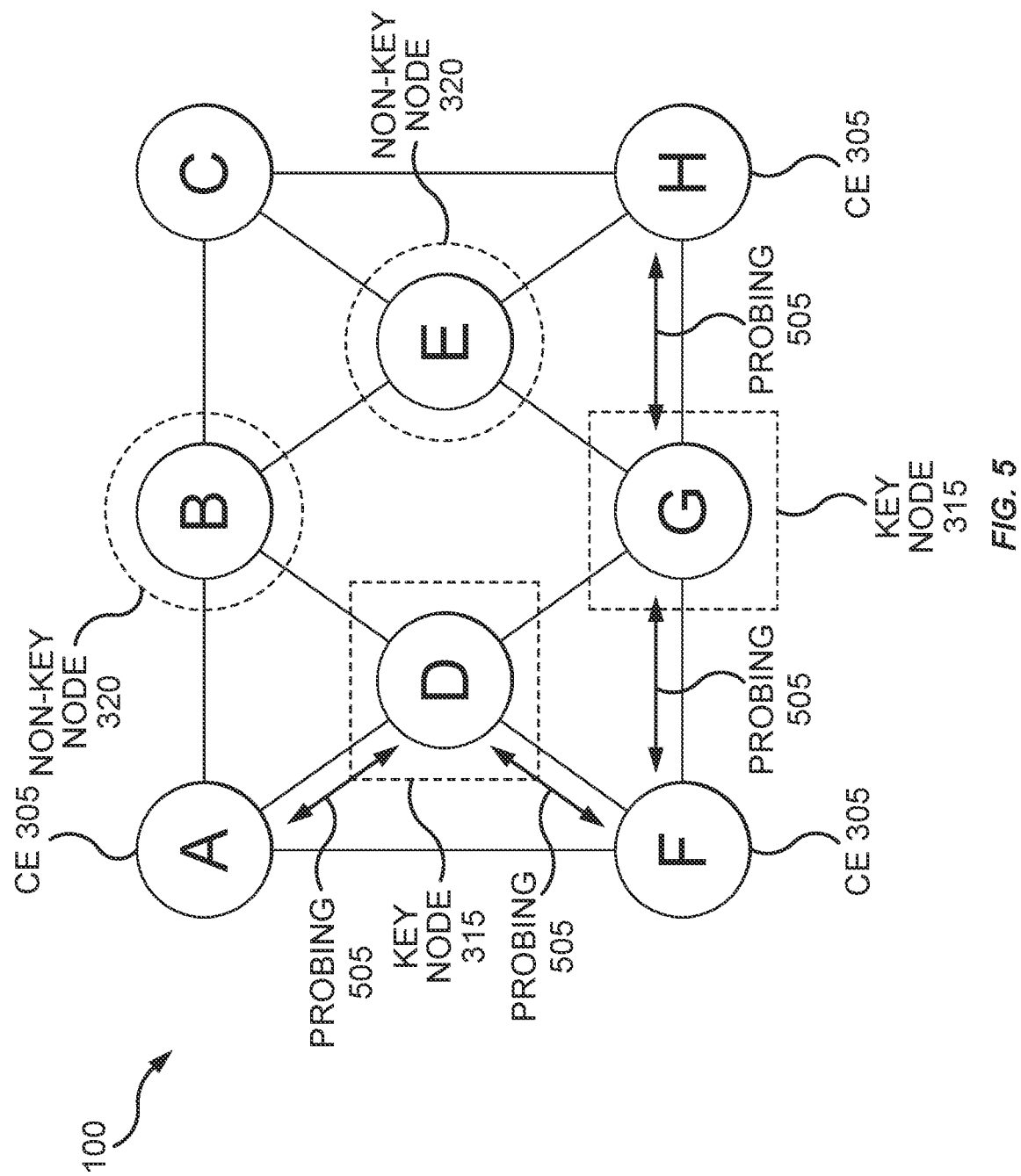
FIG. 5 illustrates probing between key nodes and customer edge nodes in a network, according to embodiments described herein.

FIG. 5 illustrates probing between key nodes and CE nodes in the network 100, according to embodiments described herein. As shown, probing 505 is performed between CE Node A and key Node D, CE Node F and key node D, CE Node F and key Node G, and CE Node H and key Node G. Notably, probing is not performed between the CEs and the non-key Nodes B and E.

Further, in one embodiment, the probe controller may perform probing 505 between a CE node and a key node only if a shared path or flow includes both of those nodes. For example, in one embodiment although CE Node A and key Node D have a direct connection, if the path controller determines that there is not at least one path or flow that includes both of those nodes, then it would not exchange probes between those nodes. As mentioned above, the probes may be used to estimate end-to-end metrics for the flow or paths. Thus, if no flow or path includes both Node A and Node D, then learning metrics of the connection between those nodes may not be useful for estimating metrics for end-to-end paths in the network 100.

While the blocks 210 and 215 are illustrated as being separate, they may be performed in parallel. That is, at the same time the network is probing between the key nodes, it can also be transmitting probes between the customer endpoints and the key nodes. Thus, blocks 210 and 215 can be performed at separate times, or in parallel.

The probes discussed in FIGS. 2-5 are not limited to any particular type of probe, or in the metrics these probes measure (e.g., latency, jitter, packet loss, etc.). In one embodiment, transport-layer probing can be used to evaluate for virtual private network (VPN) service instances over the policies. This can use built-in segment routing-performance measurement (SR-PM) probes and external probes that can be deployed physically at strategic points in the network or virtually as containers. In one embodiment, the probes send telemetry to a common central collector (e.g., the probe controller) where data is analyzed.

As an example, Segment Routing On-Demand Next Hop (SR-ODN) allows a service head-end router to automatically instantiate an SR policy to a BGP next-hop when required (on-demand). It provides per destination steering behaviors where a set of prefixes from a service can be associated with a desired underlay SLA. The ingress router in the network instantiates the policy after contacting the path controller (e.g., SR-PCE) to request computation for a path toward the egress router that meets SLA.

Returning to the method 200, at block 220 the probe controller estimates one or more performance metrics for paths based on measurements obtained from the first and second set of probes. Based on these metrics, the probe controller can determine whether paths through the network (e.g., end-to-end paths) satisfy SLAs. For example, the metrics obtained from the performing blocks 210 and 215 can be combined, such as added, or weighted, to determine an overall metric for a particular path. As an example, latency or jitter measured at each segment of a path can be added together to estimate a total latency or total jitter of the entire path (e.g., between two CE devices).

In one embodiment, probing among key nodes and the probing between edge nodes and key nodes are combined for end-to-end service-layer probing and used to compute the symptoms and health of L3VPN services and other overlay services.

Referring to FIG. 1, the path 120 includes the Nodes F, D, G, and H. The metrics for each hop or connection between these nodes was measured during blocks 210 and 215. That is, the connection between Node D and Node G was probed during block 210 while the connections between Node F and Node D and between Node G and Node H were probed at block 215. In this manner, the probes obtained from blocks 210 and 215 can be used to estimate overall metrics for each path or flow in the network.

Moreover, some end-to-end paths may traverse through non-key nodes in the network, where probing was not performed. The probe controller may add a set or fixed metric value for these segments when determining the overall performance metric for the end-to-end path. Or the probe controller may include a margin of uncertainty into the estimate of the overall performance metric depending on how many non-key nodes were in the path or flow.

Figure 6:
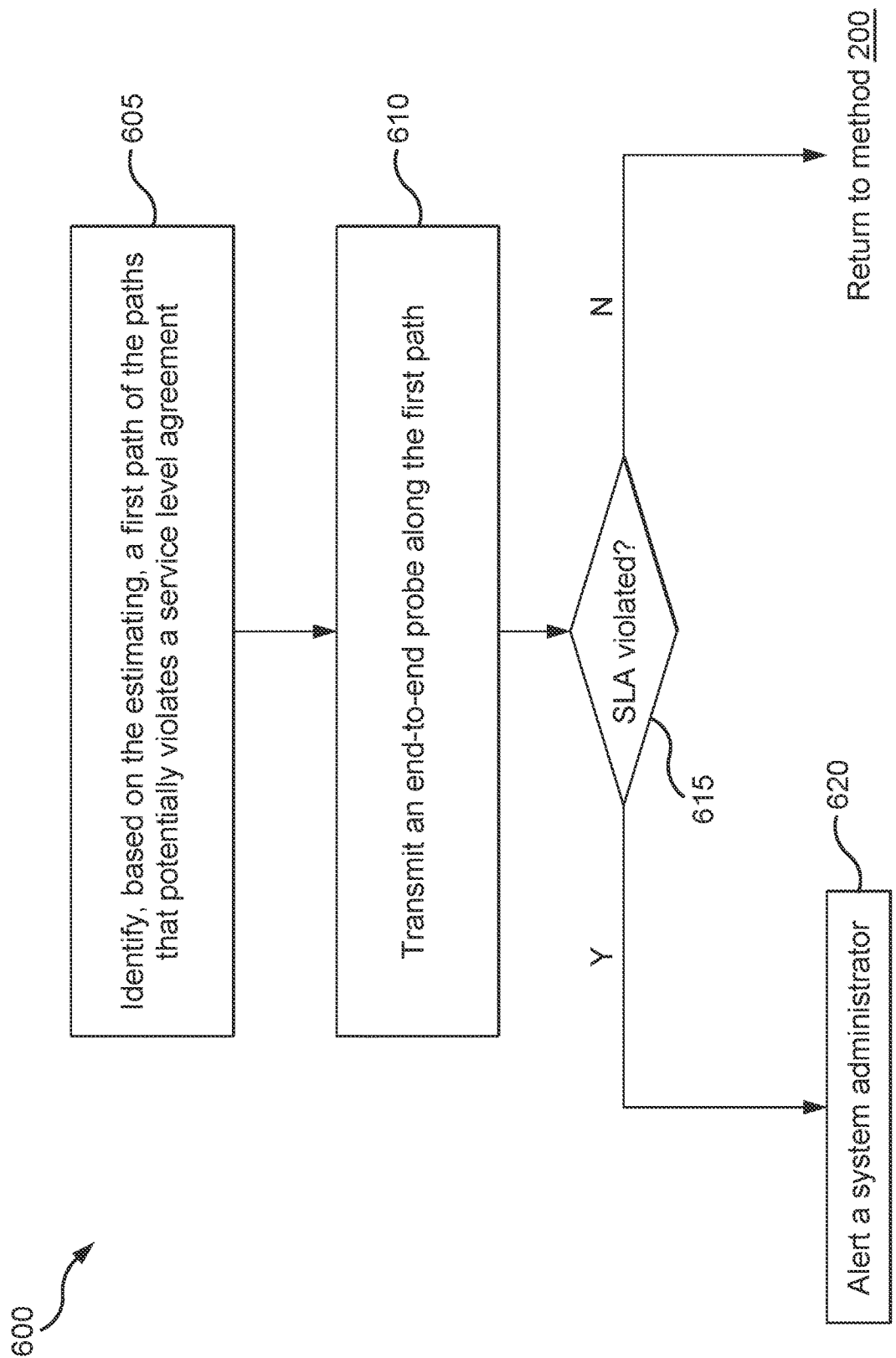
FIG. 6 is a flowchart for using the flowchart in FIG. 2 as an indicator to perform additional probing, according to embodiments described herein.

Different techniques for estimating overall metrics for end-to-end paths or flows using selective probing is discussed in more detail in FIG. 6. Specifically, FIG. 6 illustrates using the estimate determined at block 220 as an indicator to perform a more accurate measurement of an end-to-end path.

FIG. 6 is a flowchart of a method 600 for using the flowchart in FIG. 2 as an indicator to perform additional probing, according to embodiments described herein. At block 605, the probe controller identifies, based on the estimating performed in FIG. 2, a first path that potentially violates a SLA.

In one embodiment, the estimate performed at block 220 of the method 200 is a safe or conservative approximation. Because the network has several different service classes and metrics are not generally Euclidian, it may not be possible in general to get exact measurements of all paths from a reduced set of probes. For these reasons, the probe controller can generate safe approximations of the performance of the end-to-end paths using the reduced set of probes obtained using the method 200. For example, the probes sent at blocks 210 and 215 of the method 200 can be sent in the lowest service class, and the partial measurements in each probe can be combined in the most conservative way (e.g., partial jitters are added together). Moreover, a tunable margin of safety can be added. This safe approximation may represent a worst case scenario of the end-to-end paths, and as such, any path that is close to violating the SLA based on the estimating can be selected for further testing or monitoring.

At block 610, the probe controller transmits an end-to-end probe along the first path that was identified at block 605. Unlike the probes sent in the method 200 which may traverse a connection only between two network nodes (and only if those nodes are key nodes or CE devices), the probe launched at block 610 may transmit all the nodes in an end-to-end path. As such, the probe can gather information about each segment or hop as it traverses the path (which can include both key nodes and non-key nodes). As such, end-to-end probing can provide a more accurate measurement of the overall metric(s) of the path.

In one embodiment, the probe controller automatically determines to perform end-to-end probing, for example, using a software sensor or available hardware Small Formfactor Pluggable (SFP). In addition, since the system can have a continuous view of the network topology via the path controller, it can periodically reevaluate the probe deployment and adjust as the usage pattern and capabilities of the network change.

Further, in one embodiment, the probing metrics obtained from the method 200 can be streamed into a big data analysis engine that employs machine learning (e.g., one or more machine learning algorithms) for trending and baselining analysis. The feedback from the baseline analysis can identify additional paths that are either eccentric or otherwise notable where end-to-end probing adds predictive power. Put differently, rather than combining the metrics obtained from the selective probing to generate an estimate of metrics for an end-to-end path, machine learning can be used to generate the estimate and then identify paths that may potential violate the SLA, and thus, where end-to-end probing should be performed. Further granularity can be added to the monitoring so that certain clear violations are treated more severely, for instance, when connectivity is completely disrupted.

At block 615, the probe controller determines, based on the metric(s) gathered during end-to-end probing whether the SLA was violated. If yes, at block 620, the probe controller can alert a system administrator, or inform the path controller which may be able to take a corrective action automatically. If the SLA is not violated, the method 600 can return to method 200 where the selective probing may be repeated. For example, the system may repeat method 200 at intervals, or when there is a change in network topology or an indicator that overall network performance has changed.

Figure 7:
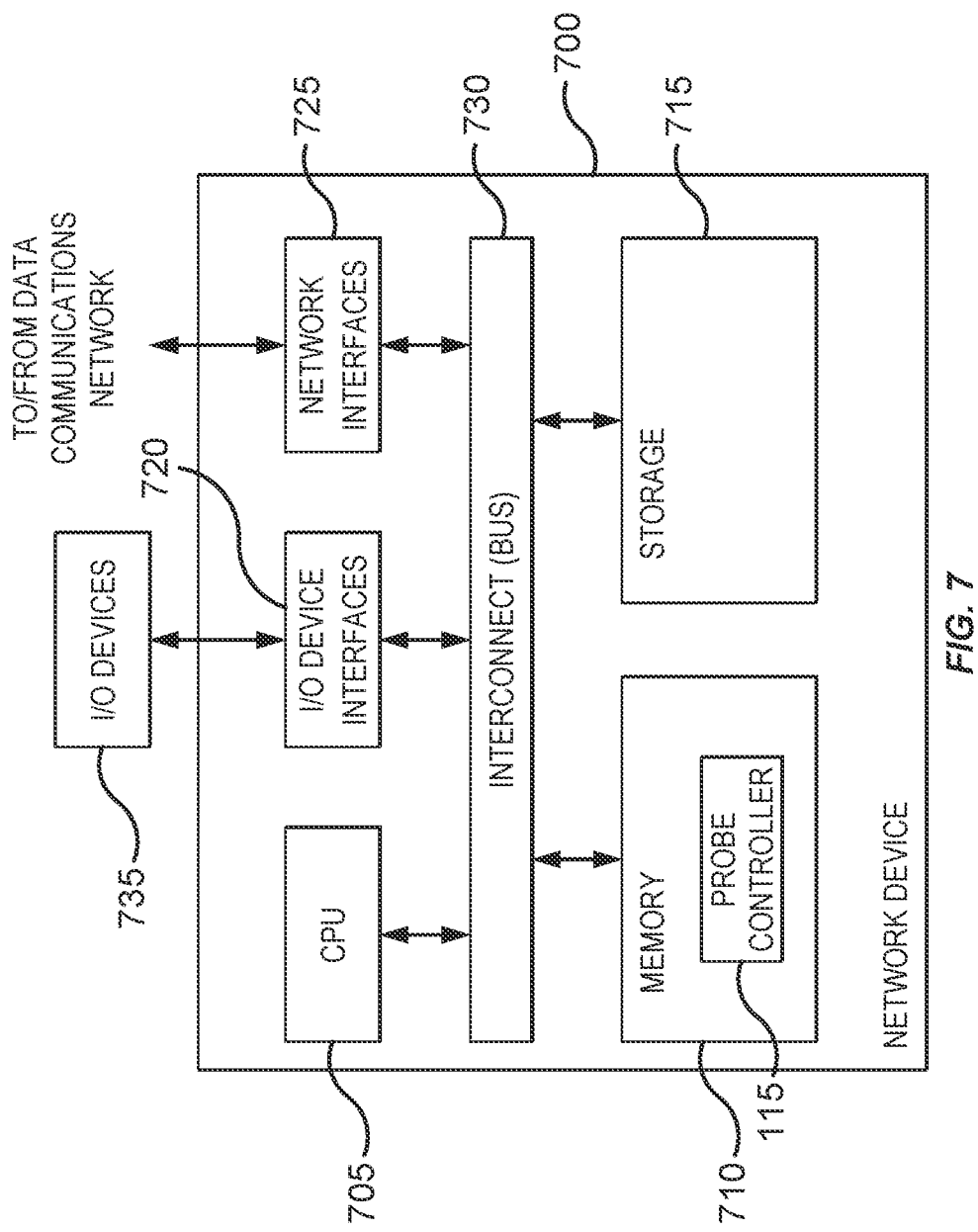
FIG. 7 depicts an example computing device configured to perform various aspects of the present disclosure, according to some embodiments of the present disclosure.

FIG. 7 depicts an example computing device or a computing system (e.g., a network device 700) configured to perform various aspects of the present disclosure, according to some embodiments of the present disclosure. In some embodiments, the network device 700 corresponds to a computing device that includes or implements the probe controller 115 or the path controller 110 illustrated in FIG. 1. Although depicted as a physical device, in embodiments, the network device 700 may be implemented using virtual device(s), and/or across a number of devices (e.g., in a cloud environment).

As illustrated, the network device 700 includes a CPU 705, memory 710, storage 715, a network interface 725, and one or more I/O interfaces 720. In the illustrated embodiment, the CPU 705 (e.g., one or more processors) retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the network device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes the probe controller 115 (e.g., a software application), which may perform one or more embodiments discussed above in FIGS. 1-6 where selective probing is performed to generate estimates regarding performance metrics for end-to-end paths or flows in a network. Although depicted as discrete components for conceptual clarity, in embodiments, the operations of the depicted components (and others not illustrated) may be combined or distributed across any number of components. Further, although depicted as software residing in memory 710, in embodiments, the operations of the depicted components (and others not illustrated) may be implemented using hardware, software, or a combination of hardware and software.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computing system, comprising:
one or more memories; and
one or more processors communicatively coupled to the one or more memories, a combination of the one or more processors configured to:
identify a subset of nodes in a network based on evaluating one or more network heuristics;
transmit, after identifying the subset of nodes, a first set of probes between the subset of nodes that are connected to each other;
transmit a second set of probes between customer endpoints in the network and the subset of nodes the customer endpoints are connected to; and
estimate one or more performance metrics for paths through the network based on measurements obtained from the first and second sets of probes.

2. The computing system of claim 1, wherein the one or more processors are configured to:
identify, based on the estimating, a first path of the paths that potentially violates a service level agreement (SLA); and
transmit, after identifying the first path, an end-to-end probe along the first path, wherein the end-to-end probe travels between two customer endpoints in the network.

3. The computing system of claim 2, wherein the one or more processors are configured to:
confirm whether the first path violates the SLA based on one or more measurement obtained from the end-to-end probe.

4. The computing system of claim 2, wherein the identifying the first path is performed by inputting the measurements obtained from the first and second sets of probes into a machine learning algorithm.

5. The computing system of claim 1, wherein the first and second sets of probes are sent in a lowest service class.

6. The computing system of claim 5, wherein the estimating comprises:
combining delay or jitter measured by multiple ones of the first and second sets of probes for each of the paths to estimate a total delay or a total jitter for each of the paths, wherein the total delay or the total jitter is compared to SLAs to determine whether the paths potentially violate the SLAs.

7. The computing system of claim 1, wherein the one or more network heuristics used to identify the subset of nodes comprises a number of paths that includes each of the nodes or an amount of traffic that flows through each of the nodes.

8. A method, comprising:
identifying a subset of nodes in a network based on evaluating one or more network heuristics;
transmitting, after identifying the subset of nodes, a first set of probes between the subset of nodes that are connected to each other;
transmitting a second set of probes between customer endpoints in the network and the subset of nodes the customer endpoints are connected to; and
estimating whether paths through the network satisfy service level agreements based on measurements obtained from the first and second sets of probes.

9. The method of claim 8, further comprising:
identifying, based on the estimating, a first path of the paths that potentially violates a service level agreement; and
transmitting, after identifying the first path, an end-to-end probe along the first path, wherein the end-to-end probe travels between two customer endpoints in the network.

10. The method of claim 9, further comprising:
confirming whether the first path violates the service level agreement based on one or more measurement obtained from the end-to-end probe.

11. The method of claim 9, wherein the identifying the first path is performed by inputting the measurements obtained from the first and second sets of probes into a machine learning algorithm.

12. The method of claim 8, wherein the first and second sets of probes are sent in a lowest service class.

13. The method of claim 12, wherein the estimating comprises:
combining delay or jitter measured by multiple ones of the first and second sets of probes for each of the paths to estimate a total delay or a total jitter for each of the paths, wherein the total delay or the total jitter is compared to the service level agreements to determine whether the paths potentially violate the service level agreements.

14. The method of claim 8, wherein the one or more network heuristics used to identify the subset of nodes comprises a number of paths that includes each of the nodes or an amount of traffic that flows through each of the nodes.

15. A non-transitory computer readable medium comprising computer-executable instructions, which when collectively executed by one or more processors of a computing system cause the computing system to perform an operation comprising:
identifying a subset of nodes in a network based on evaluating one or more network heuristics;
transmitting, after identifying the subset of nodes, a first set of probes between the subset of nodes that are connected to each other;
transmitting a second set of probes between customer endpoints in the network and the subset of nodes the customer endpoints are connected to; and
estimating whether paths through the network satisfy service level agreements based on measurements obtained from the first and second sets of probes.

16. The non-transitory computer readable medium of claim 15, wherein the operation further comprises:
identifying, based on the estimating, a first path of the paths that potentially violates a service level agreement; and
transmitting, after identifying the first path, an end-to-end probe along the first path, wherein the end-to-end probe travels between two customer endpoints in the network.

17. The non-transitory computer readable medium of claim 16, wherein the operation further comprises:
confirming whether the first path violates the service level agreement based on one or more measurement obtained from the end-to-end probe.

18. The non-transitory computer readable medium of claim 16, wherein the identifying the first path is performed by inputting the measurements obtained from the first and second sets of probes into a machine learning algorithm.

19. The non-transitory computer readable medium of claim 15, wherein the first and second sets of probes are sent in a lowest service class.

20. The non-transitory computer readable medium of claim 19, wherein the estimating comprises:
combining delay or jitter measured by multiple ones of the first and second sets of probes for each of the paths to estimate a total delay or a total jitter for each of the paths, wherein the total delay or the total jitter is compared to the service level agreements to determine whether the paths potentially violate the service level agreements.

* * * * *